F. P. SCHNITZEN AND N. P. COLLIS.
STEAMING RECEPTACLE.
APPLICATION FILED MAY 6, 1916.
1,310,931.
Patented July 22, 1919.
2 SHEETS—SHEET 1.
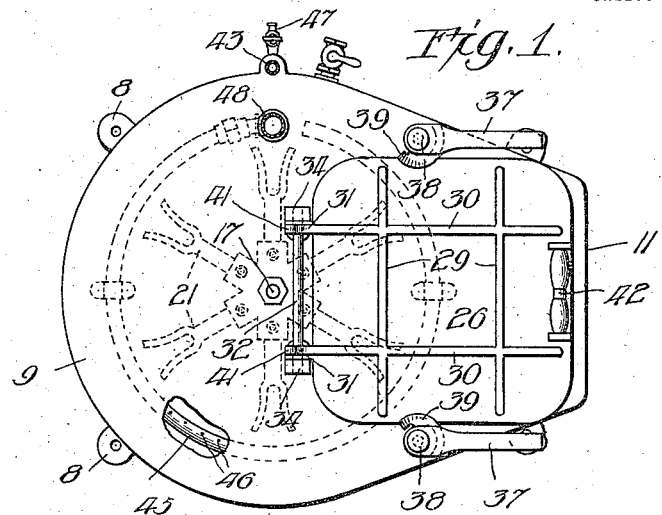
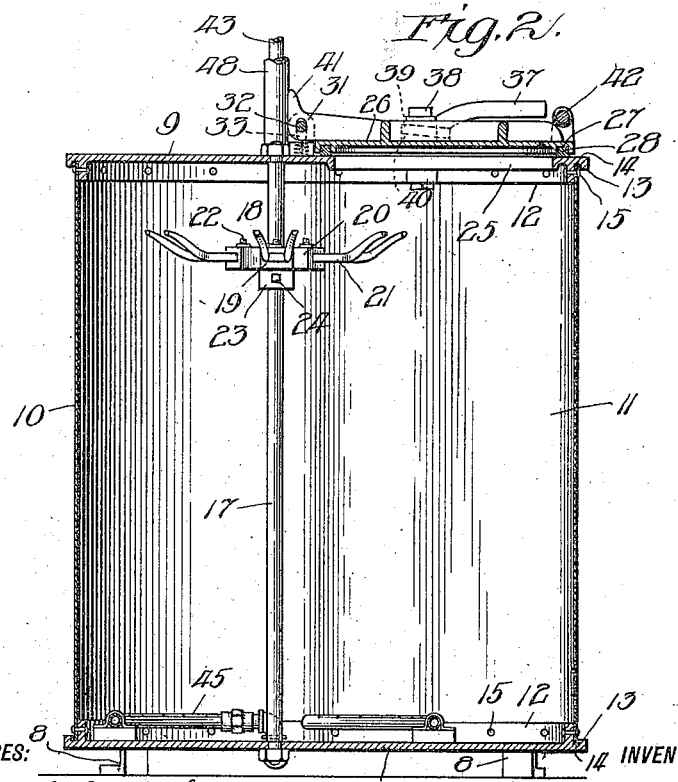

F. P. SCHNITZEN AND N. P. COLLIS.
STEAMING RECEPTACLE.
APPLICATION FILED MAY 6, 1916.
1,310,931.
Patented July 22, 1919.
2 SHEETS—SHEET 2.
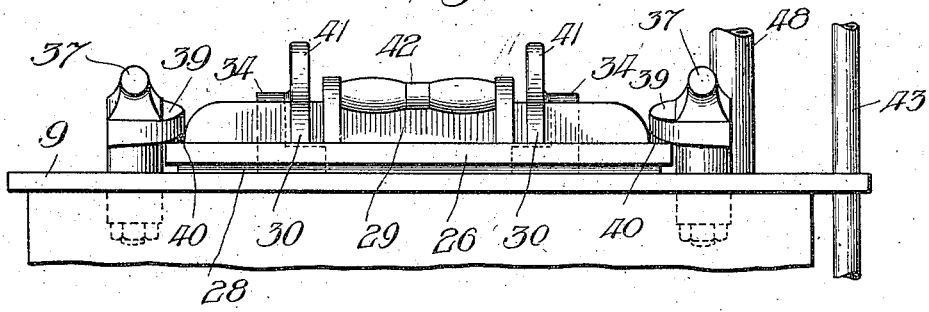
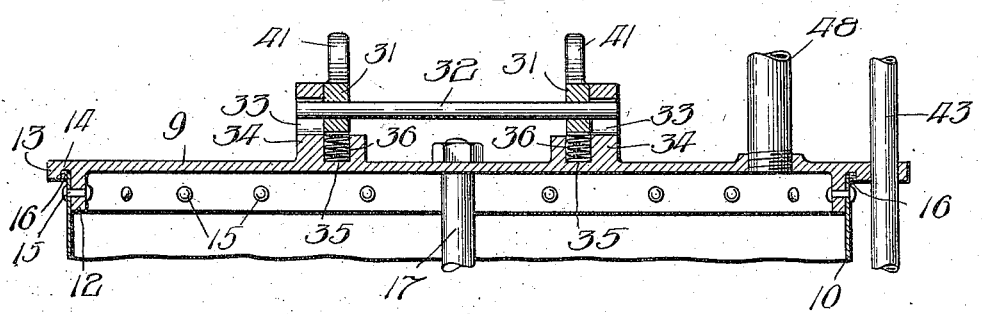
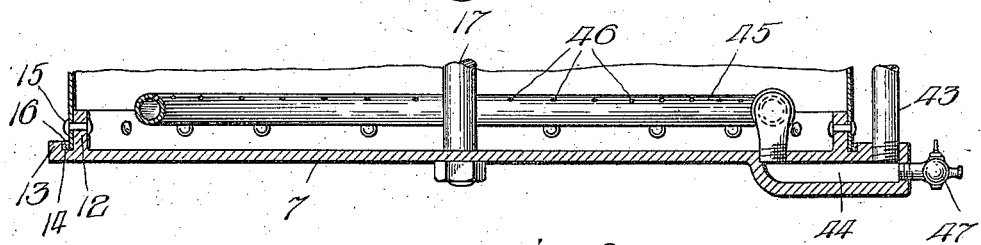
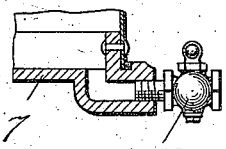
WITNESS:
Harry S. Gaither
INVENTORS:
Frank P. Schnitzen
Norman P. Collis
BY
Banning & Banning
ATTORNEYS
THE COLUMBIA PLANOGRAPH CO., WASHINGTON, D. C.

UNITED STATES PATENT OFFICE.

FRANK P. SCHNITZEN, OF CLINTON, AND NORMAN P. COLLIS, OF DUBUQUE, IOWA, ASSIGNORS TO OLIVER D. COLLIS, OF CLINTON, IOWA.

STEAMING-RECEPTACLE.

1,310,931.    Specification of Letters Patent.    Patented July 22, 1919.

Application filed May 6, 1916. Serial No. 95,946.

*To all whom it may concern:*

Be it known that we, FRANK P. SCHNITZEN, a citizen of the United States, residing at Clinton, in the county of Clinton and State of Iowa, and NORMAN P. COLLIS, a citizen of the United States, residing at Dubuque, in the county of Dubuque and State of Iowa, have invented certain new and useful Improvements in Steaming-Receptacles, of which the following is a specification.

This invention relates primarily to a steaming receptacle designed for use in the steaming of ducks, geese, and other fowls, although it may be used for other purposes in which a steam and water tight receptacle is required.

The object of the invention is to so construct the receptacle that it can be easily opened or closed during its manipulation, and so as to provide suitable and convenient means for the suspension of the fowls during the steaming operation.

Another object of the invention is to make adequate provision for the admission and venting of the steam and for the discharge of water of condensation; and still further objects and characteristics will be apparent from a detailed description of the invention.

At the present time it is quite common to prepare ducks, geese, or other fowls for the removal of the feathers by immersing the fowls in scalding water for a brief time, but this practice is objectionable, for the reason that it so saturates the feathers with moisture that difficulty is afterward experienced in drying and curing them for the market. By employing steam rather than scalding water, the feathers will become but slightly dampened, so that they can be easily and quickly dried out and prepared for storage or shipment.

The present invention is designed to so distribute the steam in minute jets that it will fill the chamber evenly, and thereby obviate the danger which is sometimes experienced of burning or parching the skin, which may occur where the force of the steam jet is played directly upon the fowls.

It is desirable, furthermore, that means be afforded for venting the steam after the operation is completed, in order that the fowls may be removed from the steamer without permitting the escape of clouds of steam into the room, which would occasion discomfort to the attendants and be objectionable from every standpoint.

In the drawings:

Figure 1 is a top or plan view of the steaming receptacle of the present invention;

Fig. 2 is a longitudinal sectional elevation of the same;

Fig. 3 is an enlarged detail of the cover and associated parts;

Fig. 4 is an enlarged detail in section showing the hinge for the cover;

Fig. 5 is an enlarged detail in section showing the steam discharge coil; and

Fig. 6 is a detail of the drain pipe.

The receptacle as a whole is of generally cylindrical form, and consists of a base plate 7 mounted upon legs or standards 8, and a cap plate 9 and a body wall 10. The receptacle, although of generally cylindrical formation, is provided at one side with a protuberance 11 designed to facilitate the introduction and removal of the fowls into the interior of the receptacle, and the base and cap plates, and body wall, are extended and enlarged correspondingly.

The base and cap plates are each provided with a relatively high inner flange 12, and a relatively low outer flange 13, which arrangement affords a pair of intermediate channels 14 of somewhat greater width than the thickness of the metal composing the body wall, and into these channels the upper and lower edges of the body wall are entered and held by means of rivets 15; and in order to afford joints sufficiently tight to prevent the escape of steam or water, a packing 16, preferably of lead, is provided in each channel, as best shown in Fig. 4.

Through the center of the main cylindrical portion of the receptacle is entered a post or standard 17 which serves to reinforce this portion of the structure and also serves as a mounting for a rotatable suspending bracket 18, which comprises a hub 19 provided with a plurality of radially arranged socket lugs 20, each of which is designed to receive the inner end of a forked hanger 21, which is held in place by means of a set screw 22 or the like. The forked hangers, as shown, are six in number, although obviously the number may be varied, and each of the hangers is designed to embrace the neck of a goose, duck, or other fowl, and hold the same suspended above the floor of the receptacle.

In order to provide for adjustment in the height of the rotatable suspending bracket 18, a collar 23 is fitted upon the post or standard 17 and held in position by a set screw 24, which arrangement affords a support for the rotatable suspending bracket, which may be adjusted to any desired position upon the post and afterward locked in adjusted position.

In the protuberant portion of the cap plate 9 is an opening 25, which is provided with a lip or flange around its lower edge, and this opening is adapted to be closed by means of a cover 26 provided with a groove or channel 27 around its edge, which receives a rubber packing or sealing strip 28 adapted to bear against the upper surface of the cap plate around the margin of the opening 25. The cover on its outer side is reinforced by means of transverse ribs 29 and longitudinally extending ribs 30, which intersect one another, and the ribs 30 are extended at their inner ends to afford ears 31, through which is entered a hinge pintle 32, the outer projecting ends of which are mounted within slots 33 in a pair of upstanding lugs 34 formed on the cap plate near the center thereof. Immediately adjacent to each of the lugs 34 is a socket recess 35, which receives a coil spring 36 fitted to bear against the under side of the coöperating ear 31, which arrangement normally serves to elevate the hinge pintle to the upper ends of the slots 33 in the lugs 34, so that the cover will hinge about the pintle in elevated position, which is desirable in order to avoid undue wear or strain upon the rubber gasket.

In order, however, to force the cover down into sealing contact with the cap plate, a pair of handles 37 are provided, one on each side of the cover, each of the handles is pivoted at its inner end to a vertical stud 38, and is provided near its pivotal mounting with an inwardly projecting cam lug 39 which coöperates with a cam elevation 40 on the adjacent edge of the cover, so that when the handles are turned inwardly to the position shown in Fig. 1, the cam lugs will ride up on the coöperating cam surfaces, which serves to force the cover down tightly into contact with the cap plate, and furthermore serves to force the hinge pintle 32 downward within its slotted mountings and against the tension of the springs 36, thereby compressing the gasket and tightly sealing the cover in position.

In order to limit the movement of the cover when raised, the ears 31 are upwardly extended to afford stops 41 which will bear against the surface of the cap plate when the cover is thrown back beyond its vertical position; and in order to facilitate manipulation of the cover, a handle 42 is provided near the outer edge of the cover.

Steam is admitted through a steam supply pipe 43, the lower end of which is entered into a cored passageway 44 formed on the under side of the base plate, as shown in Fig. 5, which passageway communicates with a coil 45, which occupies a position near the bottom of the receptacle and affords a ring-shaped distributer for the steam which is admitted to the receptacle through a plurality of small vent openings 46, as shown in Fig. 5. The steam supply pipe and coil can be drained through a drain cock 47 entered into the end of the passageway 44; and in order to provide for the venting of the steam in the receptacle prior to the opening of the cover, a steam vent pipe 48 is entered through the cap plate, as shown in Fig. 4, a drain cock 49 being also provided for the interior of the receptacle.

In use, the cover will be thrown back into its upstanding position, after which access may be had to the interior of the receptacle. The arrangement of the rotatable suspending bracket is such that one or more of the forked hangers will project outwardly into the space immediately beneath the opening in the cap plate, so that the geese, ducks, and other fowls may be easily hung from the forked hangers, and after each is positioned the bracket will be turned slightly to bring an empty hanger into position, which manipulation will be repeated until the bracket is loaded, after which the cover will be dropped to place and sealed and the steam admitted. The steam will be discharged into the interior through the small vent holes in the coil, thereby thoroughly distributing the steam throughout the interior and preventing a striking or impingement of a heavy steam jet against any of the suspended fowls. After the lapse of a short time, the steam supply will be turned off, the cover lifted, and the fowls removed for plucking.

Although the invention has been described as being designed particularly for use in the steaming of such fowls as geese, ducks, and the like, it may be used for the scalding of chickens or other poultry, in which case water can be poured into the receptacle and heated to any temperature by the admission of steam. It is also preferable, in the scalding of poultry, to remove two of the hangers and simply suspend the chickens or other poultry through the open cover by holding them by the feet and immersing them into the hot water. Obviously, also, the device can be used for the heating of water for other purposes, either with or without the employment of a rotatable suspending bracket.

We claim:

1. In a device of the class described, the combination of a receptacle provided with an opening in its top, a vertical post within the receptacle at one side of said opening, a suspending bracket rotatably mounted on said post and provided with a plurality of radially arranged forked hangers, a cover for said opening, and means for admitting steam to the interior of the receptacle, substantially as described.

2. In a device of the class described, the combination of a receptacle provided with an opening in its top, a vertical post within the receptacle at one side of said opening, a suspending bracket rotatably mounted on said post and provided with a plurality of radially arranged forked hangers, a cover for said opening, a ring-shaped coil located near the bottom of the receptacle and provided with vent openings, and a steam pipe connected with said coil for admitting steam thereto, substantially as described.

3. In a device of the class described, the combination of a receptacle of generally cylindrical formation, provided with a protuberance on one side thereof and an opening in the top of said receptacle into the protuberant portion thereof, a cover for said opening, a vertical post within the receptacle at one side of said opening, and a suspending bracket rotatably mounted on said post and provided with a plurality of radially arranged forked hangers, substantially as described.

4. In a device of the class described, the combination of a receptacle of generally cylindrical formation, provided with a protuberance on one side thereof and an opening in the top of said receptacle into the protuberant portion thereof, a cover for said opening, a vertical post within the receptacle at one side of said opening, a suspending bracket rotatably mounted on said post and provided with a plurality of radially arranged forked hangers, and means for vertically adjusting said bracket on said post, substantially as described.

5. In a device of the class described, the combination of a receptacle of generally cylindrical formation, provided with a protuberance on one side thereof and an opening in the top of said receptacle into the protuberant portion thereof, a cover for said opening, a vertical post within the receptacle at one side of said opening, a suspending bracket rotatably mounted on said post and provided with a plurality of radially arranged forked hangers, a ring-shaped coil near the bottom of said receptacle and provided with a plurality of steam vent openings, and a steam supply pipe connected with said coil, substantially as described.

6. In a device of the class described, the combination of a receptacle of generally cylindrical formation, provided with a protuberance on one side thereof and an opening in the top of said receptacle into the protuberant portion thereof, a cover for said opening, a vertical post within the receptacle at one side of said opening, a suspending bracket rotatably mounted on said post and provided with a plurality of radially arranged forked hangers, means for vertically adjusting said bracket on said post, a ring-shaped coil near the bottom of said receptacle and provided with a plurality of steam vent openings, and a steam supply pipe connected with said coil, substantially as described.

7. A steam tight receptacle of the kind described, having, in combination, an opening for admission to its interior, a post within the receptacle, a member rotatably mounted on the post, a plurality of hangers carried by the member and arranged to present consecutively their extremities in proximity to the receptacle opening, and means for adjusting the position of the member longitudinally of the post, whereby the hangers are brought nearer to or farther away from the receptacle opening as desired, substantially as described.

FRANK P. SCHNITZEN.
NORMAN P. COLLIS.

Witnesses:
L. F. SUTTON,
A. M. COOPER.

Copies of this patent may be obtained for five cents each, by addressing the "Commissioner of Patents, Washington, D. C."